United States Patent [19]

Dupuy et al.

[11] 4,447,065
[45] May 8, 1984

[54] SEALING STRIP

[75] Inventors: Ronald E. Dupuy, Wabash; John E. Clark, Marion, both of Ind.

[73] Assignee: The General Tire & Rubber Company, Akron, Ohio

[21] Appl. No.: 470,424

[22] Filed: Feb. 28, 1983

[51] Int. Cl.³ .......................... E06B 7/22; F16J 15/16
[52] U.S. Cl. ..................................... 277/184; 49/491; 52/400
[58] Field of Search ................... 49/491, 497; 277/184, 277/211; 52/400, 717

[56] References Cited

U.S. PATENT DOCUMENTS

| | | | |
|---|---|---|---|
| 3,200,448 | 8/1965 | Bright | 49/491 |
| 4,103,459 | 8/1978 | Barnerias et al. | 49/497 |
| 4,114,320 | 9/1978 | Pullan | 49/497 |
| 4,165,083 | 8/1979 | Dochnahl | 277/184 |
| 4,193,605 | 3/1980 | Josephson | 277/184 |
| 4,304,816 | 12/1981 | Bright et al. | 49/491 |

Primary Examiner—Robert I. Smith

[57] ABSTRACT

A U-shaped polymeric strip to be mounted on a body flange adjacent a vehicle door opening has an improved sealing structure for preventing moisture from seeping around the end of the body flange inside the U-shaped strip. The sealing structure is located at the inside of the base of the U-shaped strip and comprises a polymeric material, such as sponge rubber, that is relatively soft compared to the relatively hard polymeric material of the main portions of the strip. The relatively soft polymeric material of the sealing structure is formed into two parts, each having a convex outer surface, separated by a slot that extends lengthwise of the strip and receives the edge of the body flange.

3 Claims, 3 Drawing Figures

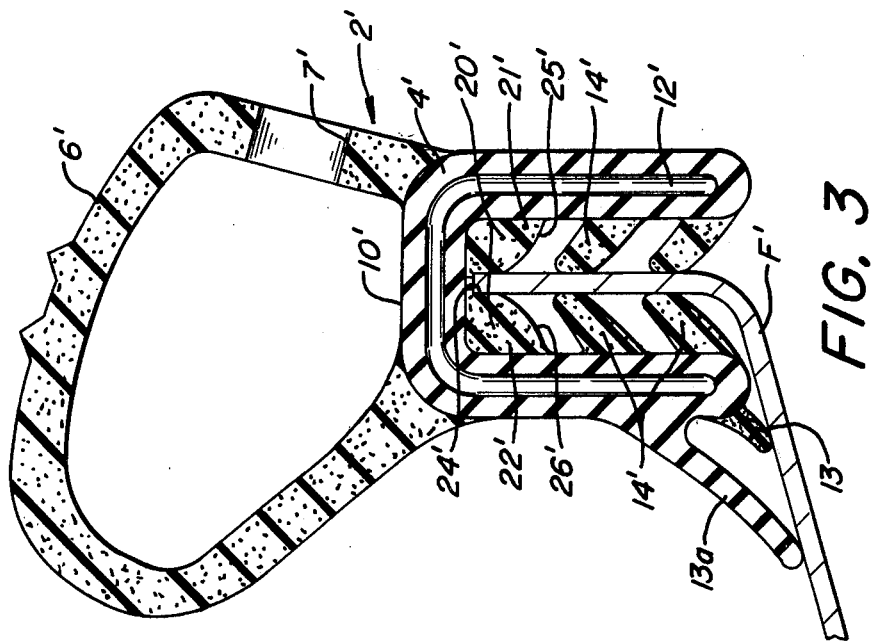

SEALING STRIP

The present invention relates to polymeric strips that are mounted on flanges adjacent vehicle door openings, including both side door and hood openings.

More particularly, the invention relates to the means employed for preventing moisture from seeping between such polymeric strips and the flanges on which they are mounted. While some of these strips are applied for decorative purposes only, most have the function of sealing the space between the door and the adjacent body flange when the door is closed. Thus, the seepage of moisture around the strip at any location usually presents a serious defect.

Vehicle door sealing strips usually include a U-shaped channel of a relatively hard polymeric material, such as plastic or dense rubber, which fits over the flange. In most cases, a metal carrier is either embedded in the channel or attached to its inner or outer surface. Elastomeric gripping ribs on the inside surfaces of the legs of the channel are designed for frictional engagement with the vehicle body flange, to hold the channel on the flange. In addition, a protrusion having a hollow, bulb-shaped cross section extends from the outside surface of the channel and is designed to be squeezed between the door and the flange to form a moisture-tight seal. Both the gripping ribs on the inside and the bulb-shaped protrusion on the outside of the channel may be made of either the same material as the channel, or a softer material such as sponge rubber. Examples of vehicle door sealing strips of the foregoing designs are shown in U.S. Pat. Nos. 3,165,793; 3,167,825; 4,042,741; 4,103,459; 4,143,497; and 4,232,081.

One problem in the design of these sealing strips has been that moisture can seep between the gripping ribs on the inside surfaces of the U-shaped channel and the vehicle body flange on which the channel is mounted. A common way of solving this problem has been to place a bead of butyl mastic at the base of the interior of the channel. This mastic then becomes lodged between the end of the vehicle body flange and the channel when the channel is mounted on the flange, thereby preventing moisture from passing through this area. However, the application of such mastic requires a separate operation that often leads to sticky mastic being left in unwanted places. Also, the mastic is difficult to apply evenly, without gaps occuring along the length of the channel. Furthermore, breaks in the mastic can develop during use, as the result of hardening and cracking.

A number of channel designs have been developed for solving this sealing problem without the use of mastic. Many involve making some or all of the gripping ribs of a softer material than the other parts of the channel, usually the same sponge rubber as used for the external bulb. Examples of such designs are shown in U.S. Pat. Nos. 4,232,081 and 4,092,813; and FIG. 6 of U.S. Pat. No. 4,103,459. With other channel designs, a solid, concave, sponge rubber protrusion is located at the base of the channel where the mastic is usually applied, as shown in FIGS. 1, 3, 4 and 5 of U.S. Pat. No. 4,103,459. In still other designs, a hollow elastomeric bulb is put in place of the mastic, as shown in U.S. Pat. Nos. 4,123,100 and 4,143,497; and in FIG. 2 of U.S. Pat. No. 4,103,459. While these designs have prevented moisture seepage with varying degrees of success, none have worked as well as desired. Also, the protrusions and bulbs in the bases of the channels shown in U.S. Pat. Nos. 4,103,459; 4,123,100 and 4,143,497 have tended to force their respective channels off their flanges, because of the compressive forces built up in these members when they are forced into sealing engagement with the ends of the flanges.

An object of this invention is to provide a polymeric strip to be mounted on a flange adjacent a vehicle door opening which has an improved, moisture-inhibiting sealing engagement with the flange, so that a separately applied mastic bead will not be required.

Another object of the invention is to provide a polymeric strip of a design that not only has improved, moisture-inhibiting sealing engagement with a vehicle body flange but will also grip the strip securely to the flange without a tendency to come loose.

The polymeric strip made in accordance with the invention includes a channel-shaped metal carrier and a relatively hard polymeric covering enclosing this carrier. The covering is also channel-shaped and has two relatively hard polymeric legs connected by a relatively hard polymeric base portion, and one or more gripping ribs protruding inwardly from the inside facing walls of each of the relatively hard polymeric legs. There is also a sealing member of relatively soft polymeric material protruding from the inside facing wall of the base portion.

This sealing member has two parts, each with an inwardly facing wall of convex shape. These parts are separated by a slot in the sealing member that extends lengthwise of the strip along the middle of its base portion and receives the edge of a vehicle body flange when the strip is mounted on the flange, with the inwardly facing convex walls of the two parts of the sealing member in sealing engagement with the flange.

In one embodiment, the gripping ribs on the inside of the legs of the strip are of a relatively hard polymeric material on their sides facing toward the base portion of the strip and a relatively soft polymeric material their sides facing away from this base portion. In another embodiment, these gripping ribs are of a relatively soft polymeric material throughout.

These and other objects, features, and advantages of the invention will be more apparent from the following detailed description and the attached drawings in which:

FIG. 2 is a cross-sectional view of the polymeric strip of FIG. 1, mounted on a flange adjacent a vehicle door opening; and FIG. 3 is a cross-sectional view of a polymeric strip designed to be mounted on a flange adjacent a vehicle door opening, illustrating a second embodiment of the present invention.

Figure 1:
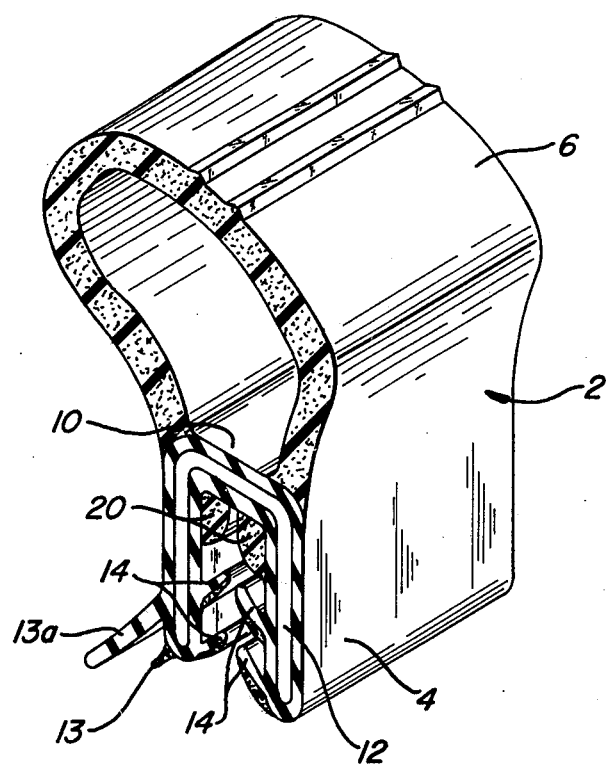
FIG. 1 is a fragmentary cross-sectional perspective view of a polymeric strip designed to be mounted on a flange adjacent a vehicle door opening, illustrating one embodiment of the present invention.

The polymeric strip 2, shown in fragmentary perspective by itself in FIG. 1 and in cross-section mounted on a vehicle door flange F in FIG. 2, has a relatively hard channel shaped portion 4, and a relatively soft bulb-shaped protrusion 6 with vent holes such as hole 7 (FIG. 2) spaced along its length. In the present embodiment, both parts are of EPDM rubber, the channel shaped portion 4 having legs 8 and a base portion 10 of dense rubber, while the bulb-shaped protrusion 6 is of a soft, highly-blown sponge rubber. The degree to which the sponge rubber of the protrusion 6 is blown depends on the degree of flexibility required by the vehicle manufacturer's specifications. For the purpose of the embodiment illustrated in FIGS. 1 and 2, these specifications require a very highly-blown EPDM rubber.

The dense rubber of the legs 8 and base portion 10 of the channel-shaped portion 4 are reinforced by a metal carrier 12. This carrier may be of any known design, and be made of either a continuous flat metal strip as shown in U.S. Pat. No. 4,348,443; individual flat metal strips as shown in U.S. Pat. No. 3,167,825; or of a wire-looped structure as shown in U.S. Pat. No. 3,091,821. Preferably, the carrier 12 is of a spring steel.

The channel-shaped portion 4 also has lips 13 and 13a protruding from one of its legs 8 and engaging the flange F. The lip 13 is made of the same sponge rubber as the bulb-shaped protrusion 6, and prevents the passage of much of the moisture that would otherwise flow along the flange F and into the space between the legs 8 of the strip 2. The lip 13a is made of the same dense rubber as the channel-shaped portion 4 and acts primarily as a cosmetic covering for the lip 13, although the lip 13a also prevents the passage of some moisture.

For the purpose of gripping the flange F, each of the legs 8 is equipped with two gripping ribs 14 that extend inwardly toward each other and are also slanted toward the base portion 10. The sides 16 of the ribs 14 facing away from the base portion 10 are of the same sponge EPDM rubber as the bulb-shaped protrusion 6, while the rear sides 18 of the ribs 14 are of the same dense EPDM rubber as the channel shaped portion 4. The sponge sides 16 help to seal out moisture that tends to run around the end of the flange F, on the inside of the channel portion 4. However, because it is much easier to extrude the strip 2 using the same sponge material as is used for the protrusion 6, and because the specifications for the protrusion 6 in this embodiment call for a very soft, highly blown sponge rubber, the sponge material 16 is too soft to provide the desired grip on the flange F by itself. Thus, the sponge sides 16 of the ribs 14 are backed by the dense rubber sides 18.

The sealing member 20 is in two parts 21 and 22, with a slot 24 separating them. The respective inwardly facing walls 25 and 26 of the parts 21 and 22, are of convex shape, and these walls are wedged outwardly away from each other when the flange F is slid into the slot 24. Because the parts 21 and 22 are thus compressed more laterally toward the legs 8 than inwardly against the base portion 10, they do not have the tendency to force the strip 2 off the flange F that prior sealing members have had. Yet, this construction has proven to be very effective in preventing moisture from seeping around the end of the flange F.

The sealing strip 2' of the embodiment shown in FIG. 3 differs from the strip of FIGS. 1 and 2 only in that the gripping ribs 14' are made entirely of the same sponge EPDM rubber as the bulb-shaped protrusion 6', rather than having one side of dense rubber and the other side of sponge rubber. This structure is preferred when the specifications for the protrusion 6' call for a harder low-blow sponge material, so that when the same material is used for making the gripping ribs 14', these ribs will grip the flange F' well enough that the firmer dense rubber backing is not needed. The construction of the sealing member 20' with its two parts 21' and 22' and inwardly facing walls 25' and 26', is exactly the same as the construction of the sealing member 20 of the strip 2. Also the lips 13' and 13a' are the same as the lips 13 and 13a, respectively, of strip 2.

While several embodiments of the present invention have been shown and described, other embodiments, modifications, and additions will be apparent to those skilled in the art, without departing from the scope of the appended claims.

We claim:

1. A polymeric strip to be mounted on a body flange adjacent a vehicle door opening, including a channel-shaped metal carrier, a relatively hard polymeric covering enclosing said metal carrier, said covering also being channel-shaped and having two relatively hard polymeric legs connected by a relatively hard polymeric base portion, one or more gripping ribs protruding inwardly from the inside facing walls of each of said relatively hard polymeric legs, and a sealing member of relatively soft polymeric material protruding from the inside facing wall of said base portion, wherein the improvement comprises:

said relatively soft polymeric sealing member being of two parts each joined to said base portion and to one of said legs and having an inwardly facing wall of convex shape extending from said base portion to said leg, said sealing member parts being separated by a slot that extends lengthwise of said strip along the middle of said base portion and receives the edge portion of said body flange when said strip is mounted on the body flange, with said inwardly facing convex walls of said parts of said sealing member in sealing engagement with opposite sides of said edge portion of said body flange.

2. The polymeric strip of claim 1 wherein the improvement also comprises said gripping ribs being of a relatively hard polymeric material on the sides of said ribs facing toward said base portion and a relatively soft polymeric material on the sides of said ribs facing away from said base portion.

3. The polymeric strip of claim 1 wherein the improvement also comprises said gripping ribs being of a relatively soft polymeric material throughout.

* * * * *